Sept. 3, 1968   J. F. DAVIS   3,399,476
ANIMATED SIGN
Filed Feb. 1, 1965   7 Sheets-Sheet 1
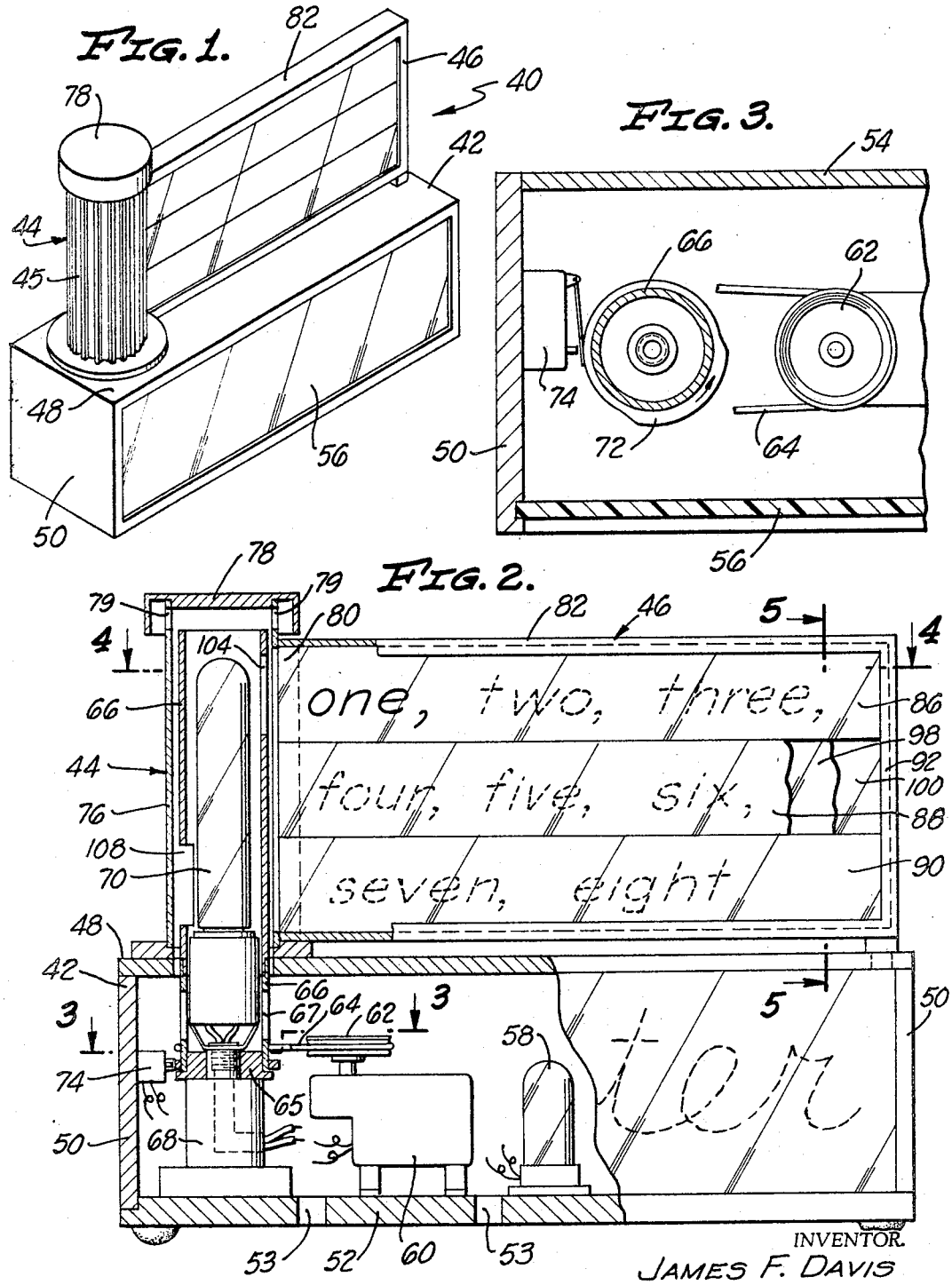
INVENTOR.
JAMES F. DAVIS
BY
EDWARD D. O'BRIAN
ATTORNEY Sept. 3, 1968    J. F. DAVIS    3,399,476
ANIMATED SIGN
Filed Feb. 1, 1965    7 Sheets-Sheet 2
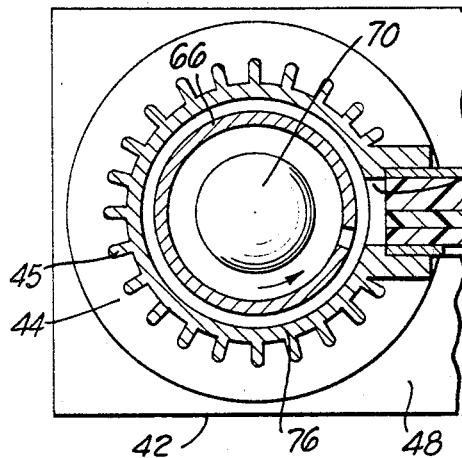
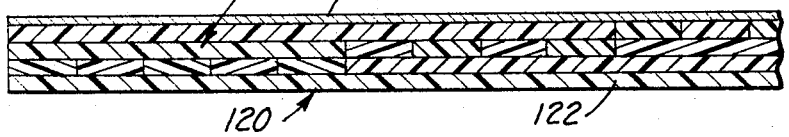
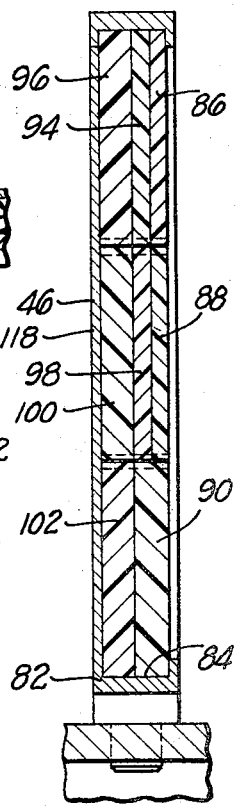
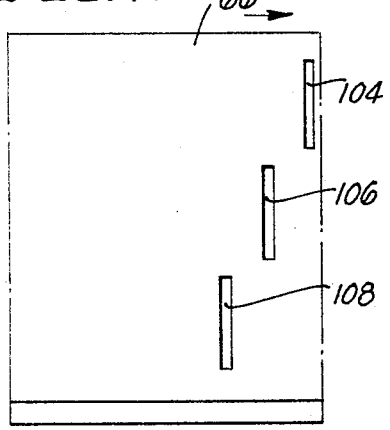
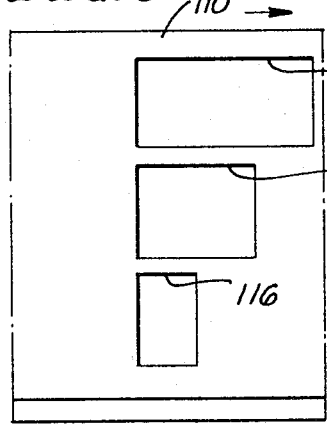
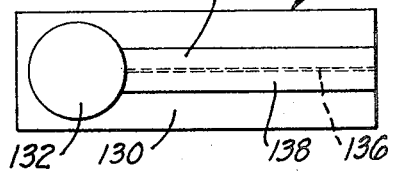
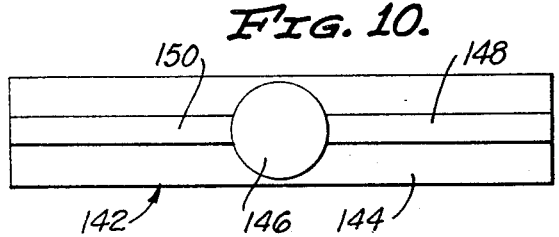
INVENTOR.
JAMES F. DAVIS
BY
EDWARD D. O'BRIAN
ATTORNEY Sept. 3, 1968 J. F. DAVIS 3,399,476
ANIMATED SIGN
Filed Feb. 1, 1965 7 Sheets-Sheet 3
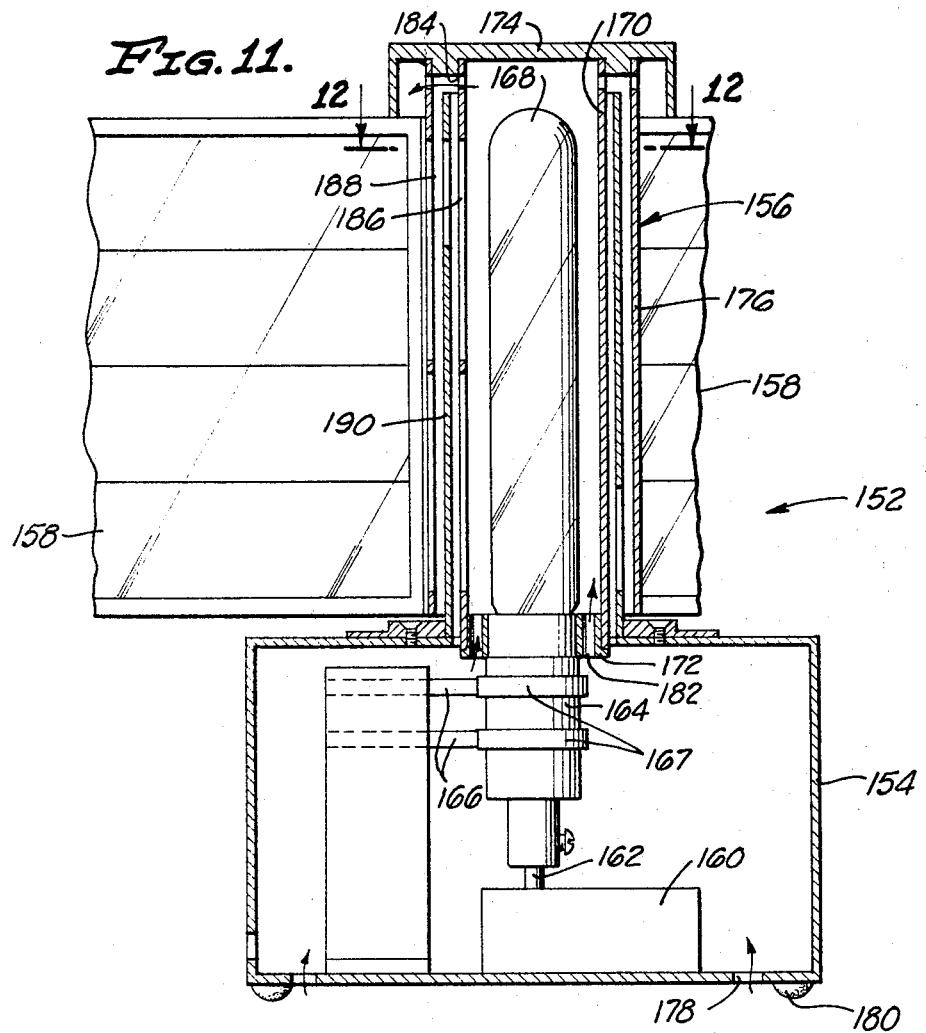
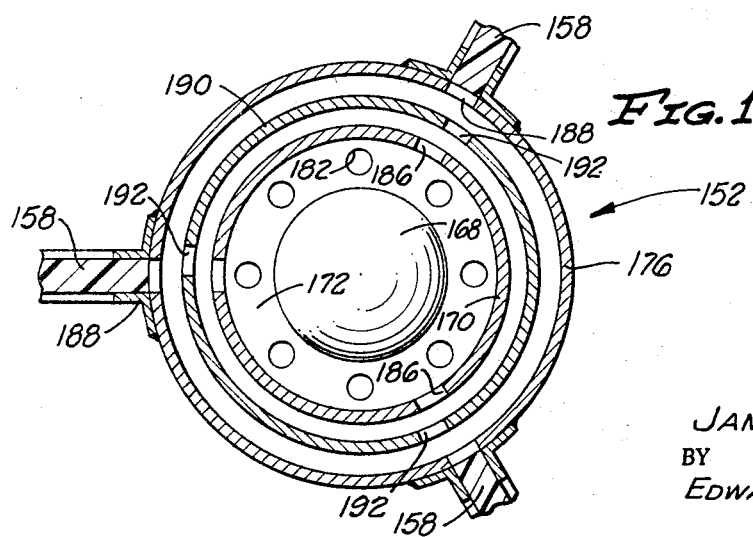
INVENTOR.
JAMES F. DAVIS
BY
EDWARD D. O'BRIAN
ATTORNEY Sept. 3, 1968 J. F. DAVIS 3,399,476
ANIMATED SIGN Filed Feb. 1, 1965 7 Sheets-Sheet 4

INVENTOR.
JAMES F. DAVIS
BY EDWARD D. O'BRIAN
ATTORNEY

Sept. 3, 1968  J. F. DAVIS  3,399,476
ANIMATED SIGN
Filed Feb. 1, 1965  7 Sheets-Sheet 5
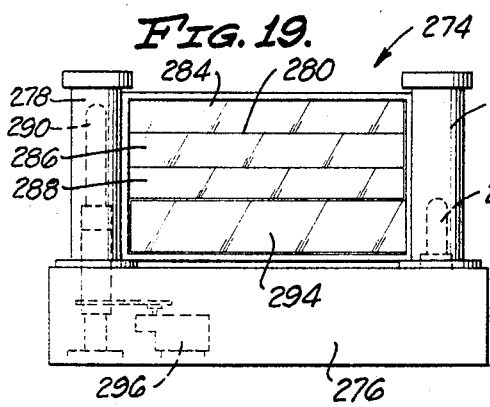
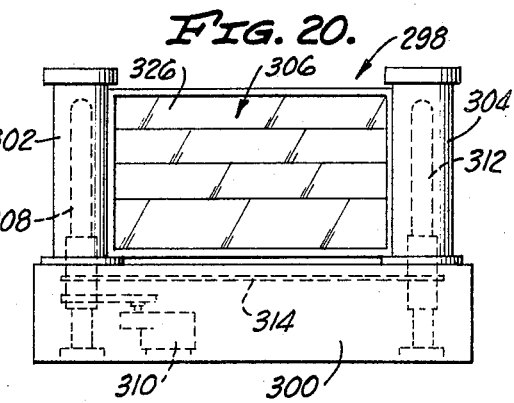
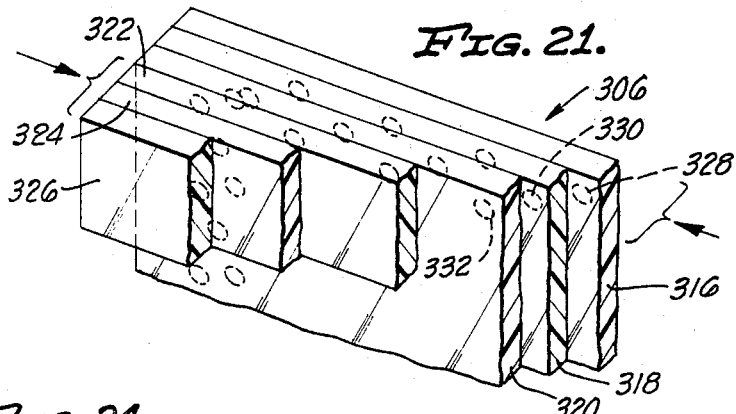
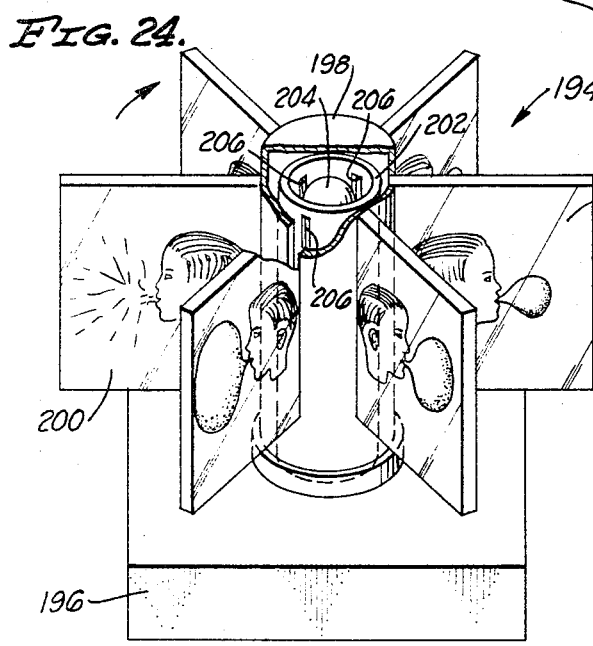
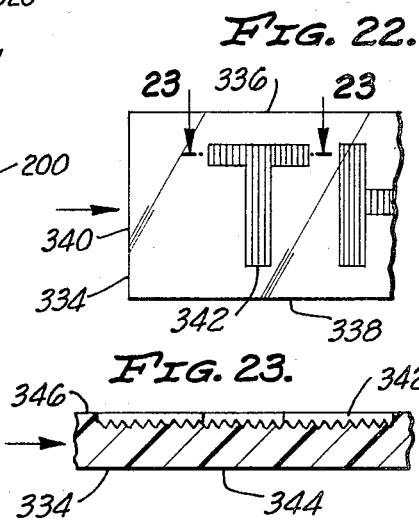
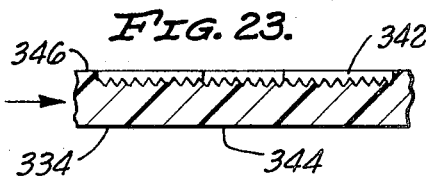
INVENTOR.
JAMES F. DAVIS
BY
EDWARD D. O'BRIAN
ATTORNEY

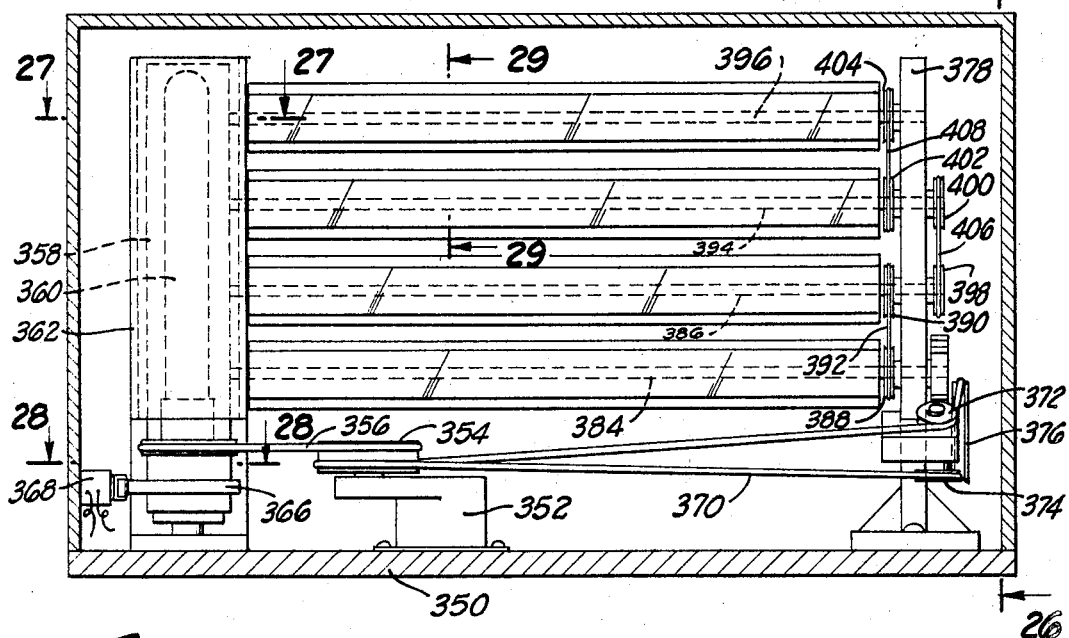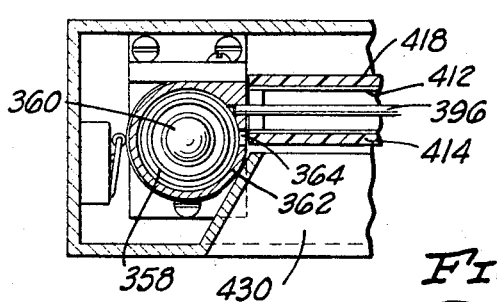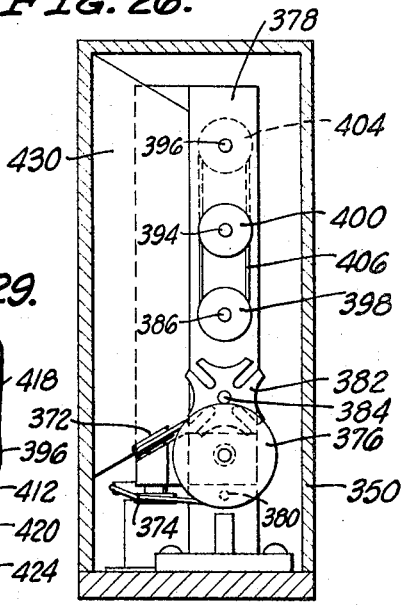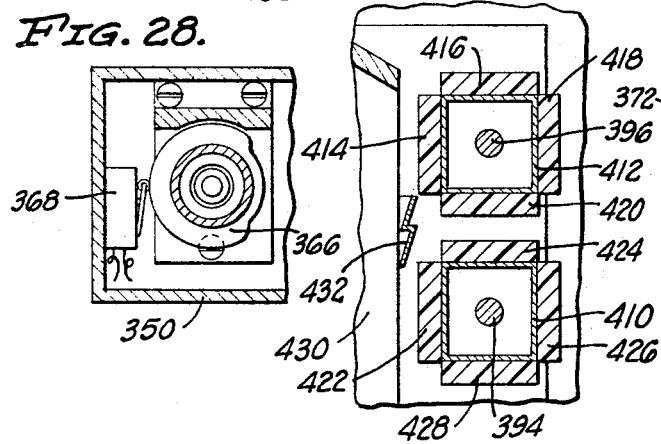

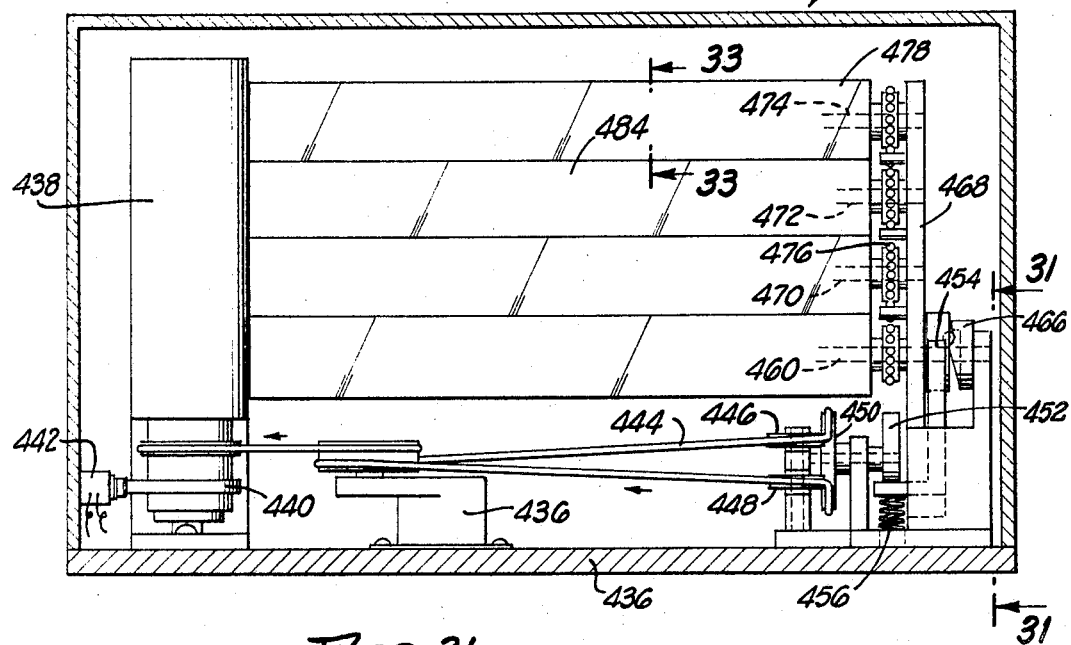

United States Patent Office 3,399,476
Patented Sept. 3, 1968

3,399,476
ANIMATED SIGN
James F. Davis, 17154 Nordhoff St.,
Northridge, Calif. 91324
Filed Feb. 1, 1965, Ser. No. 429,337
4 Claims. (Cl. 40—130)

ABSTRACT OF THE DISCLOSURE

The sign comprises a sign panel which has a plurality of sign elements. These sign elements are arranged in rows wherein they are in front to back orientation and the rows are positioned edge to edge. Each of the sign elements has an illuminable end, and these ends lie substantially in a plane. They are positioned to be illuminated by a lamp and a shutter is positioned between the lamp and the sign elements. The sign elements are made of transparent material capable of ducting light and indicia are formed on the sign elements. The shutter is arranged so that different sign elements in front to back and edge to edge relationship are illuminated so that the indicia are progressively illuminated in any desired pattern along the length of one row by progressive front to back illumination and then the remaining rows are progressively and sequentially illuminated.

The purpose of signs is to convey information, and the purpose of advertising signs is to convey information pertaining to articles or services which are for sale. Small, static signs are so commonplace that they are generally ignored. Many efforts have been made to add various sorts of illumination and animation to attract notice. More often than not the devices used to attract attention become distractions to the message of the sign after the viewer pauses to look at it. Effectiveness of such signs is thus lost.

Accordingly, it is a primary object of this invention to provide an animated electric sign that utilizes illumination and animation of the message itself in a novel way, both to attract attention and effectively impart the contents of the message.

It is another object of this invention to provide an animated sign of reasonable cost and size to provide a greater usability and attractiveness for point-of-purchase promotion.

It is another object of this invention to provide an inexpensive foolproof sign of animated character which can be readily positioned so as to reach the most viewers thereof and so as to attract their attention thereto to convey the message thereon.

It is another object of this invention to provide an animated sign which is easily arranged for the changing of the message therein so as to provide information flexibility thereof.

It is another object of this invention to provide an animated sign which comprises the sequential illumination of indicia in the face thereof so that the message is progressively illuminated to attract the viewer to read the message.

It is another object of this invention to provide an animated sign which progressively illuminates different indicia in suitable appropriate attractive color so as to provide esthetic value in addition to the maximum attention getting and attention holding power for best advertising effect.

It is a further object of this invention to provide an animated sign which has as a desirable feature the progressive illumination of different indicia and which is provided with heat dissipation means so that the sign is able to operate at a safe, reasonable temperature.

It is a further object of this invention to provide an animated sign which is economic, foolproof and trouble free so that it may be placed in unattended locations and so that it does not require regular attention of personnel regularly devoted to other tasks.

Other objects and advantages of this invention will become apparent from a study of the following portion of this specification, the claims and the attached drawings in which:

FIG. 1 is an isometric view of the preferred embodiment of the animated sign of this invention;

FIG. 2 is an enlarged elevational section thereof;

FIG. 3 is an enlarged section taken along the line 3—3 of FIG. 2;

FIG. 4 is a horizontal sectional view taken along the line 4—4 of FIG. 2;

FIG. 5 is an enlarged section taken along the line 5—5 of FIG. 2;

FIG. 6 is an enlarged section, similar to the section of FIG. 4, showing another embodiment of the sign panel portion of the animated sign of this invention;

FIG. 7 is a projected view of a shutter used in the animated sign of this invention;

FIG. 8 is a projected view of another embodiment of a suitable shutter therefor;

FIG. 9 is a top plan view of a further embodiment of the animated sign of this invention;

FIG. 10 is a top plan view of a further embodiment of the animated sign of this invention;

FIG. 11 is a partial elevational section view of another embodiment of the animated sign of this invention;

FIG. 12 is a section taken generally along the line 12—12 of FIG. 11;

FIG. 19 is a front elevational view of a further embodiment of the animated sign of this invention;

FIG. 20 is a front elevational view of another embodiment of the animated sign of this invention;

FIG. 21 is an isometric view, with parts broken away, of a sign panel useful in the embodiment of FIG. 20;

FIG. 22 is a partial front elevational view of a sign element useful in each of the embodiments of this invention;

FIG. 23 is an enlarged section taken along the line 23—23 of FIG. 22;

FIG. 24 is a front and top angular view of another embodiment of the animated sign of this invention;

FIG. 25 is a front elevational sectional view of a still further embodiment of the animated sign of this invention;

FIG. 26 is a section taken along the line 26—26 of FIG. 25;

FIG. 27 is a section taken along the line 27—27 of FIG. 25;

FIG. 28 is a section taken along the line 28—28 of FIG. 25;

FIG. 29 is an enlarged section taken along the line 29—29 of FIG. 25;

FIG. 30 is a front elevational sectional view of another embodiment of the animated sign of this invention;

FIG. 31 is an enlarged section taken along the line 31—31 of FIG. 30;

FIG. 32 is an enlarged section taken along the line 32—32 of FIG. 31; and

FIG. 33 is an enlarged section taken along the line 33—33 of FIG. 30.

Figure 13:
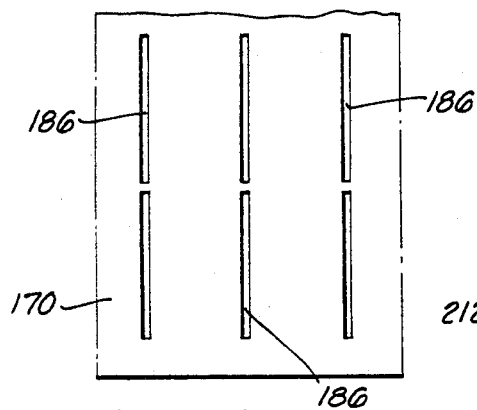
FIG. 13 is a projected view of a tube showing the light slit arrangement used in the embodiment of FIG. 11.

As an aid to understanding this invention it can be stated in essentially summary form that it is directed to an animated sign. The animated sign comprises a plurality of sign elements arranged edge to edge in a single plane in a panel positioned adjacent a light source. A light source is positioned to edge light each of the panels and a movable shutter is positioned between the light source and the sign panel so as to sequentially illuminate the sign elements. The sign elements are preferably arranged horizontally and one above the other in edge to edge relationship with edge lighting on one or both of the vertical edges. The sign elements are preferably of transparent material having such characteristics as to be able to accept light in one edge thereof to illuminate letters engraved on the surface thereof. Thus, by means of suitable shutter configuration and suitable shutter drive structure to drive it relative to the sign panels the different panels can be illuminated at different times or in any desired pattern to thus provide selective illumination and animation to the indicia engraved in the sign panels.

This invention will be understood in greater detail by reference to the following portion of this specification wherein the drawings are described. Referring now to FIG. 1, the preferred embodiment of the animated sign of this invention is generally indicated at 40. The sign 40 comprises base 42, lamp post 44 and sign panel 46. Base 42 is a substantially rectangular box having top 48, ends 50, bottom 52, back 54 and front 56. In the preferred embodiment shown, back 54 is opaque. The animated sign 40 is provided with a front 56 which is translucent and labeled with suitably different colored indicia or indicia of different translucency. Lamp 58 is positioned within base 42 so that upon its illumination the fixed indicia on front 56 are illuminated.

Also mounted within base 42 is motor 60 which drives pulley 62. Pulley 62 carries belt 64 which extends around and in driving engagement with shutter tube 66. Lamp base 68 is mounted on bottom 52 and carries lamp 70 mounted thereon. Shutter tube 66 is rotatably mounted on bearing 65 upon lamp base 68, and is driven with respect to the base by means of motor 60. Openings 67 in the bottom of shutter tube 66 permit air circulation for cooling. Cam 72, see FIG. 3, is fixed on shutter tube 66 and is arranged to turn switch 74 on and off with rotation of shutter tube 66. It is switch 74 that is connected to lamps 58 and 70 to cause their alternate illumination and darkness. Thus, switch 74 causes energization and illumination of lamp 70 during the hereinafter described progressive illumination of the sign elements, then sharp cutoff of such illumination followed by immediate lighting of lamp 58 for lighting the product name.

Lamp post 44 also includes outer tube 76 which is fixed on top 48 and carries ventilation cap 78. Ventilation cap 78 is arranged to permit the natural updraft circulation of air, which enters through holes 67, out of lamp tube 44 through holes 79 around top of tube 76 with minimum discharge of light from the top of outer tube 76. Suitable ventilation holes 53 are provided in bottom 52 to permit the entry of outside air. Such air circulation is vital for the cooling of the internal working parts within base 42 and lamp post 44.

Adequate cooling is extremely necessary to the proper and safe operation of such an animated sign, and normal circulation of air due to thermal activity due to the heating of air by the lamps in the sign causes updraft of air through holes 53 in bottom 52, ventilation openings 67, between the lamp base and the interior of shutter tube 66, as well as through the opening exteriorly of shutter tube 66 and the shutter tube opening in top 48, and thus upward interiorly of shutter tube 66 and interiorly of tube 76 to the upper portion thereof. At the upper portion the heated air exits through openings 79 and out beneath the lower edges of cap 78. This circulation aids in reducing temperatures, and such temperature control is also aided by fins 45 formed integrally on the exterior of lamp housing 44 in the manner best illustrated in FIG. 4. Thus, reasonable temperatures are maintained so that thermoplastic polymer composition materials may be used in the animated sign without serious aging thereof, and without the occurrence of temperatures disturbing to the touch.

Lamp post 44 has an opening 80 in the form of a vertical slit extending up a substantial portion of the vertical length of outer tube 76. Sign panel 46 comprises an outer rectangular frame 82 which is positioned adjacent opening 80 and contains recess 84. In the preferred embodiment a plurality of sign elements are positioned within frame 82. As shown in the preferred embodiment these sign elements include elements 86, 88 and 90 in edge to edge relationship which extend all the way from opening 80 to the end 92 of frame 82. Furthermore, the sign elements within frame 82 are arranged in a plurality in depth so that sign elements 94 and 96 are positioned behind sign element 86. Similarly, sign elements 98 and 100 are positioned behind sign element 88. In the illustrated embodiment, sign element 102 is positioned behind sign element 90. It is to be noted that in view of the fact that each of the sign elements runs the full length of the frame, they are retained therein.

As is indicated in the drawings, a plurality of individual sign elements, each carrying indicia, are arranged with respect to each other. In the preferred embodiment shown in FIGS. 1 through 5, a plurality of these are arranged in edgewise fashion. In this edgewise relationship the front surface of each lies in substantially the same plane and three separate sign elements arranged in edgewise positioning make up the planar face. Similarly, a plurality of sign elements can be positioned in a row behind, and still another plurality in a row behind that. Each of the sign elements is preferably arranged so that the adjoining edges are horizontally positioned as is shown in FIG. 2, and each of the sign elements adjoining one of the vertical face planes is arranged for edge lighting along one or both of the vertical edges. By this means progressive illumination from top to bottom on the sign can be managed with a single layer of sign elements. This arrangement makes for progressive illumination by different shutter arrangements of sign elements lying one behind the other or different sign elements lying in edgewise relationship to each other, or both can be managed within the same sign structure.

Each of the sign elements is made of such material as is capable of piping light and is capable of being arranged so that indicia engraved therein are made visible thereon when light is transmitted into the element. Preferably each of the sign elements is made out of a separate piece of acrylic polymer composition material, with the indicia engraved in the backside thereof. The preferred polymer is poly(methyl methacrylate) by reason of its optical clarity and lack of color which give excellent light transmission properties. Such material is eminently suitable for this application, but other materials may also have desirable characteristics for this use. The different indicia in FIG. 2 are each engraved in different ones of the sign elements. Thus, the indicia "one," is engraved in element 86, the indicia "two," is engraved in element 94 and the indicia "three," is engraved in element 96. These three elements are all arranged in the top row, and in the second row the indicia "four," is engraved in element 88, the indicia "five," is engraved in element 98 and the indicia "six," is engraved in element 100. These comprise the center row of elements within the sign panel 46. In the bottom row the indicia "seven," is engraved in element 90 while the indicia "eight," is engraved in element 102. It is clear that these particular indicia are shown only for illustrative purposes. Other indicia in accordance with the particular nature of the information to be displayed by the sign are preferably engraved thereon.

Referring now more particularly to FIGS. 2, 4 and 7, two types of progressive illumination of indicia are shown. Shutter tube 66 is illustrated as having slit openings 104, 106 and 108 and each slit is equal to the thinnest sign element 98. Motor 60 drives shutter tube 66 in a counterclockwise direction as viewed from the top, see FIG. 4, and lamp 70 directs illumination toward these slit openings. When these openings line up with the ends of the various sign elements, light is transmitted into them so that the indicia engraved therein are illuminated and made visible. As is seen in FIGS. 2 and 7, the openings are vertically aligned with individual rows of sign elements. Thus, opening 104 directs illumination successively into the top row of sign elements, opening 106 directs light into the middle row of sign elements, and opening 108 directs light into the bottom row of sign elements as shutter tube 66 is rotated. Since the openings in the shutter tube 66 are equal to the thinnest sign element, the sign elements are successively lighted in a front to back relationship. Thus, the light passes through opening 104 and first lights sign element 86, and then lights sign element 94. In view of the narrowness of opening 104, the time during which both sign element 86 and sign element 94 are illuminated is not very long. After sign element 94 is illuminated, sign element 96 is illuminated and sign element 94 very shortly thereafter goes dark. In view of the progressive relationship around shutter tube 66 of shutter tube openings 104, 106 and 108, and in view of the fact that the trailing edge of opening 104 is ahead of the leading edge of opening 106 by a distance substantially equal to the total thicknesses of all three of the sign elements 86, 94 and 96, the illumination of sign element 96 ceases substantially at the same time that the illumination of sign element 88 begins. This same process, as described above, occurs through sign elements 88, 98 and 100. Again the distance between the trailing edge of opening 106 and leading edge of opening 108 is substantially equal to the total thickness of the three sign elements so that sign element 90 is not lighted until sign element 100 ceases to receive illumination.

It is important to note that while the openings in the shutter tube 66 permit successive illumination in front to back order through the sign elements, that a vertically staggered relationship of the slots in the shutter tube 66 permits successive vertical illumination of the sign elements in the front of the sign. In fact, should lesser wording be desired on the sign, or should an entire line desired to be lighted at the same time, only one sign element need be located at each vertical level. In such a case the shutter tube successively illuminates the sign elements positioned in edge to edge relationship on a vertical basis. The character of the English language is such that left to right reading of each line and line arrangement from top to bottom is necessary. Thus, an arrangement of horizontal sign elements corresponding to word positioning arranged in edge to edge relationship, corresponding to line positioning, becomes most desirable for most economic use of materials and most satisfactory results. The vertically arranged shutter tube of FIG. 1 lights one vertical edge of horizontally disposed sign elements and comprises the preferred embodiment.

An alternative structure of the shutter tube is illustrated in FIG. 8 wherein the shutter tube is indicated by the numeral 110. Shutter tube 110 has openings 112, 114 and 116 and these openings are arranged so that their front edges are progressively arranged from top to bottom, and their rear edges are in line. By this construction of the shutter tube the various sign elements in the top row are progressively illuminated, and the illumination thereof is maintained while the middle row of sign elements is progressively illuminated. Furthermore, the illumination of both the top and middle rows is maintained while the bottom row is progressively illuminated. Thus, the indicia become illuminated sequentially, yet all are maintained illuminated until the cam operating switch 74 cuts off the light 70 to thus sharply cut off the illumination from all sign elements at the same time.

In the embodiment of FIGS. 1 through 5, the sign panel 46 is shown as having back plate 118. This back plate is provided to prevent back lighting of the various sign elements so as to render them more visible. If desired, to give the impression of the indicia standing on a transparent plate, this back panel may be left off. Furthermore, a colored lamp 70 may be placed to illuminate each of the indicia with the same color, or if different colors are desired, the illuminated ends of the several panels can be furnished with appropriate color filters so that each is illuminated in a different color. If each row is to have the same color, the filters may be placed over openings 104, 106 and 108.

Referring now to FIG. 6, sign panel 120 is shown therein. Sign panel 120 is of similar construction to sign panel 46 and is provided with a frame to maintain the various sign elements in position. Sign panel 120 differs from sign panel 46 in that it is provided with a transparent front sheet 122 which extends over the entire face of the sign, and with back plate 124 which may or may not be transparent, as has been previously discussed, and with a plurality of sign elements generally indicated at 126 positioned therebetween. The significant difference between sign panel 120 and sign panel 46 is the fact that the sign elements 126 are arranged in a divided manner so that a plurality of separate small sign elements may be placed in a single horizontal row. This permits flexibility in the building up of signs. Individual letters can be placed in proper sequence to spell a word, and the creative effort in individualizing a sign for a particular message is reduced. This kind of construction is particularly useful where signs need be regularly changed. Sign panel 120 is directly applicable in the structure of sign 40.

The animated sign 40 of the preferred embodiment is described as presenting indicia from one side thereof, and arranged with either an opaque backing or transparency to the sign panel. Referring now to FIG. 9, another but similar embodiment of the animated sign is indicated at 128. Sign 128 has a base 130, lamp post 132, and sign panels 138 and 140 which are substantial duplications of the sign panel 46. An opaque plate 136 is positioned between these sign elements. These sign elements are selectively and sequentially illuminated by the structure in lamp post 132, which is identical to lamp post 44. Thus, as the shutter moves past the various sign elements on the first side 138 in the manner previously described, it continues to move past the sign elements arranged in the second side 140 so as to selectively, progressively illuminate them in a similar manner. Thus, a double faced sign, visible both from the first side and second side, is created. Of course, the indicia on the first and second sides may be the same or may be different depending on the particular application and display desired.

Referring now to FIG. 10, another embodiment of the animated sign is shown herein at 142. Sign 142 has a base 144 and lamp post 146. Sign 142 has first and second sign panels 148 and 150, each of them associated with lamp post 146. In this case, lamp post 146 has a slot on each side thereof for the transmission of light from the lamp contained therein to the sign panels. Each of these sign panels 148 and 150 is identical to the sign panel 46, and lamp post 146 differs from lamp post 44 only in having two light emitting slots therein. The shutter tube in lamp post 146 is identical to shutter tube 66.

Referring now to FIGS. 11 and 12, another embodiment of the animated sign is indicated therein at 152. Sign 152 comprises a base 154, lamp post 156 and a plurality of sign panels 158. Base 154 contains motor 160 which has a slowly revolving output shaft 162. Lamp holder 164 is mounted on shaft 162 for revolving therewith. Brushes 166 convey electricity to the lamp holder 164 in order to provide current to illuminate lamp 168 mounted therein. Brushes 66 engage with slip rings 167 which are electrically connected to lamp 168. Slip rings 167 are preferably provided with insulated portions so as to interrupt this conduction of electricity so as to act as a switching mechanism to turn the lamp 168 on and off. Thus, the brushes in conjunction with the slip rings act to turn off the lights to serve as a sharp cutoff for illumination at the end of the message display, and to keep the lamp off until the shutter openings are realigned for the start of a new display. In this respect the brushes and slip rings act in the same manner as cam operated switch 74 shown in FIG. 2. Carrier tube 170 is mounted on carrier 172 which rotates with the lamp holder 164. Cap 174 is mounted on carrier 170 and outer tube 176 is mounted to depend therefrom. Outer tube 176 carries sign panels 158 spaced arounds its periphery.

Ventilation openings 178 are provided in the bottom of base 154, and base 154 is raised from its support by means of feet to permit a circulation of air thereinto. Furthermore, carrier 172 has ventilation openings 182 which permits circulation of air upward through the interior of carrier tube 170. Openings 184 in cap 174 complete the air circulation path, and thus air is admitted through the interior mechanisms so as to aid in its cooling.

Carrier tube 170 has vertical slit openings 186, which in the embodiment shown in FIG. 12 are spaced 120 deg. apart to correspond with the equal spacing of the three sign panels 158. Opposite the vertical slip openings 186 are vertical slit openings 188 which are in line with the sign panels 158. Mounted upon the top of base 154 is shutter tube 190 arranged so that it is positioned between tubes 170 and 176. Shutter tube 190 is stationary while the tubes 170 and 176 rotate therearound. Shutter tube 190 is provided with shutter openings 192 which are preferably arranged in staggered relationship such as shown in FIGS. 7 and 8, but arranged so that there are four vertically positioned openings in correspondence with the four vertically positioned sign elements in each of the sign panels 158. The openings in the shutter tube, the lamp housing tube and carrier tube are each preferably equal to the single thickness of the sign elements. The openings 192 are preferably arranged in the manner as is shown in FIG. 14.

While this embodiment discloses a single layer of sign elements in the horizontal sense, and a plurality in the vertical sense, it is equally clear that a plurality of thicknesses of sign elements, one behind the other, can be provided as is indicated in the preferred embodiment of FIG. 1. However, the single thickness in this embodiment illustrates quite clearly the orientation of the various parts which provide an animated sign of optimum nature and with minimum construction problems. Thus, by use of a vertical shutter tube and horizontally arranged sign elements lighted from one end and oriented in edge to edge relationship as in printed lines, a plurality of lines may be illuminated one at a time with the employment of a single thickness of sign lamina.

Figure 14:
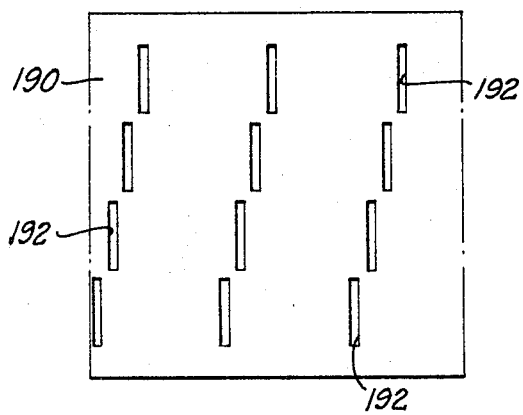
FIG. 14 is a projected view of the shutter used in the embodiment of FIG. 11.
Figure 15:
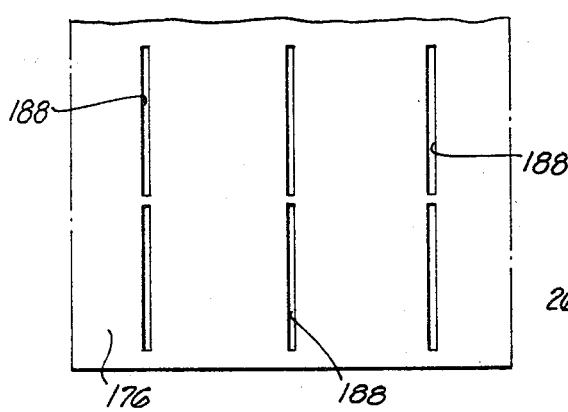
FIG. 15 is a projected view showing the light transmitting slits in the outer cylinder of the animated sign of the embodiment of FIG. 11.

Referring now to FIGS. 13, 14 and 15, the respective projections of carrier tube 170, shutter tube 190 and outer tube 176 are shown therein. It is seen that each of the slit openings 186 in carrier tube 170, openings 192 in shutter tube 190 and openings 188 in outer tube 176 are equal to the thickness of one of the sign elements. In this embodiment only one thickness of sign elements 158 is shown, and thus each of the openings 186, 192 and 188 is equal to the thickness of one sign element 158. It is clear from the above described embodiment that a plurality of thicknesses of sign elements can be used in the horizontal sense to provide for multiple, successive illuminations of words or indicia on a single horizontal line. In such a case, openings 188 and 186 remain of the presently disclosed thickness, but shutter tube opening 192 are narrower in such an embodiment so as to equal only the thickness of one of the sign elements. It is also noted that the distance between the trailing edge of one opening 192 and the leading edge of the following is substantially equal to the thickness of sign elements 158 so that illumination of one line ceases approximately at the same time as the illumination of the succeeding line occurs. Again, should a plurality of such sign elements be used in front to back relationship, the distance between the trailing edge of one opening and the leading edge of the next successive opening is preferably equal to the total thickness of all sign elements, for the reasons described above.

Each of the four elements in each of the sign panels 158 is of single thickness, so that each of the elements lights up along its entire length whenever the shutter opening 192 is aligned with the openings 186 and 188. As described above the use of a plurality of thicknesses of sign elements is feasible as an alternative embodiment in the structure. The elements of the sign panels 158 are also of the type of material described with respect to the preferred embodiment so that different indicia may be engraved upon each of the elements in the sign panel and arranged so that they light up sequentially. Furthermore, the sign revolves about the axis of lamp 168 so as to provide additional attention getting power.

Referring now to FIG. 24, animated sign 194 is indicated therein. Sign 194 is similar to sign 152 in that it employs a plurality of sign panels radially arranged and rotating. Sign 194 has a base 196, lamp post 198 and sign panels 200. In sign 194 base 196 is relatively stationary and lamp post 198 is rotated. Stationarily positioned within lamp post 198 is shutter tube 202 which is stationarily mounted with respect to base 196. Lamp 204 is mounted within shutter tube 202. Shutter tube 202 has three slits 206 which permit light to pass from the lamp 204 to the interior of lamp post 198. Six slits can be used, if desired. Sign panels 200 are radially positioned at vertically extending slits in lamp post 198. Sign panels 200 are unitary elements, that is to say that they are formed in a single piece and the entire edge of each of them is illuminated along its entire length when the sign panel is rotated past slit 206. In view of the fact that the sign panels 200 are rotating with lamp post 198, and such rotation carries them past slit 206, slit 206 acts as a shutter. As is illustrated, the sign panels 200 are particularly adapted for animated designs, and also may be used for other indicia where it is desired that they be sequentially moved toward a viewing position with respect to a viewer and sequentially illuminated.

In order to create proper animation and give proper appearance of motion, the sign elements 200 should rotate at a relatively fast rate. Persistence of vision suggests that at least about three revolutions per second, which would bring 18 frames per second in division, should be employed. Of course, the particular indicia is only illustrative, and any animated character operating on a six position cycle could very well be substituted therefor. Furthermore, the particular structure of sign 194 with respect to its shutter tube and lamp housing could be identical to the animated sign of FIG. 11. However, this simplified structure is adequate for simple animation of the sort illustrated. It is also to be noted that the shutter slit openings 206 need not be plain straight slits. If the sign panels 200 are replaced by a plurality of edgewise associated sign elements of the nature previously described, rotationally staggered slit openings corresponding to the desired sequential illumination can readily be substituted in the manner described. Furthermore, with post 198 a plurality of edgewise arranged sign elements and the shutter of FIG. 2 can be employed in this construction.

Figure 16:
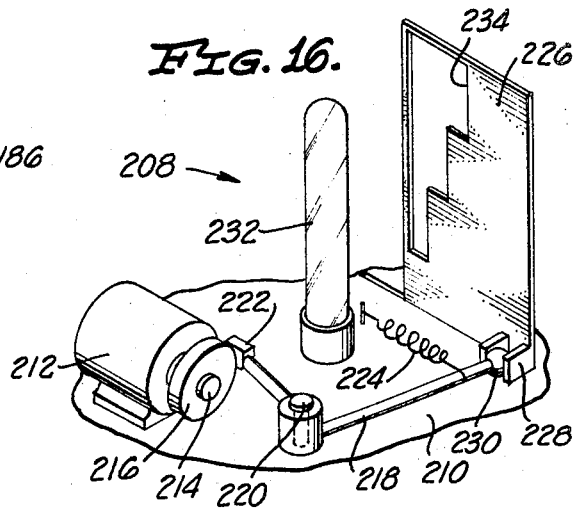
FIG. 16 is an isometric view with parts broken away showing another embodiment of a shutter drive mechanism suitable in the animated sign of this invention.

Referring now to FIG. 16, an alternative embodiment of shutter operating structure is shown therein. Such shutter operating structure and the shutter operated thereby can be used effectively in the other embodiments of the animated sign of this invention. The shutter operating structure of FIG. 16 is generally indicated at 208 and comprises a base 210 which carries motor 212. Motor 212 has a relatively slowly revolving output shaft 214 which carries cam 216. Bell crank 218 is mounted on pivot 220 which is secured to base 210. Bell crank 218 has a cam follower 222 which is held in contact with cam 216 by means of spring 224 acting on the other arm of bell crank 218. Shutter 226 is slidably mounted with respect to base 210 and carries drive plates 228. Ball 230 on the end of bell crank 218, opposite cam follower 222, engages between drive plates 228 so that upon rotation of cam 216 shutter 226 moves linearly with respect to base 210. Lamp 232 is mounted on base 210 and is suitably provided with the necessary reflectors to direct a primary portion of its light toward shutter 226. Shutter 226 has openings 234 which regulates the transmission of light through adjacent sign panels. As is seen, the opening 234 corresponds generally in shape to the shutter of FIG. 8, and alternatively can be arranged in the manner shown in FIG. 7, or other, hereinafter described patterns in accordance with the desired sequence of illumination of the associated sign panel.

Figure 17:
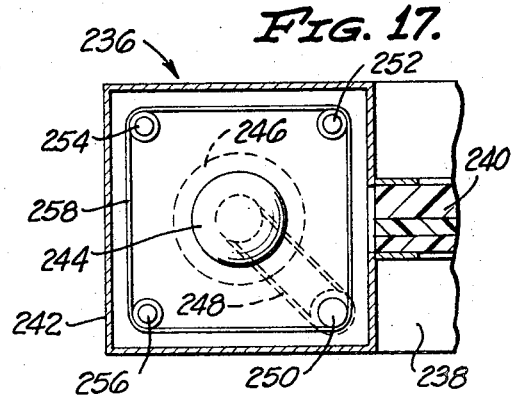
FIG. 17 is a partial horizontal sectional view showing a further embodiment of a suitable shutter mechanism usable in the animated sign of this invention.

A further embodiment of the shutter operating mechanism suitable for use in several of the animated sign structures of this invention is generally indicated at 236 in FIG. 17. This shutter operating mechanism 236 is illustrated as part of an animated sign having base 238, multilayered animated sign panel 240 and lamp tube 242. In this embodiment a square lamp tube 242 is convenient, but other shapes can be used, as is hereinafter apparent. Positioned within lamp tube 242 is lamp 244 mounted on a suitable lamp holder 246. Aligned with lamp holder 246 and positioned therebelow, and not visible in this figure, is a shutter drive motor. This shutter drive motor is positioned similarly to the motor in FIG. 11, but could just as well be set to one side as is illustrated in FIG. 2, or it could be positioned under power roll 250. Drive belt 248 is driven by the motor and drives power roll 250 which is positioned adjacent one of the interior corners of lamp tube 242. Idler rolls 252, 254 and 256 are positioned adjacent the other interior corners of the lamp tube 242.

Shutter 258 is in the form of a flexible opaque belt extending the appropriate distance in the direction parallel to the center line of the lamp and of sufficient length to embrace the four rolls. Roll 250 advances shutter 258 around the rolls. Shutter 258 has appropriate openings therein so as to permit selective opening for the transmission of light to the edge of the sign elements in sign panel 240. The openings in shutter 258 may be of the previously described types indicated in FIGS. 7, 8 and 14. Such a structure permits a greater circumferential length of shutter so that shutter patterns of greater length or shutter patterns having a plurality of openings of different configurations can be arranged circumferentially thereabout.

Figure 18:
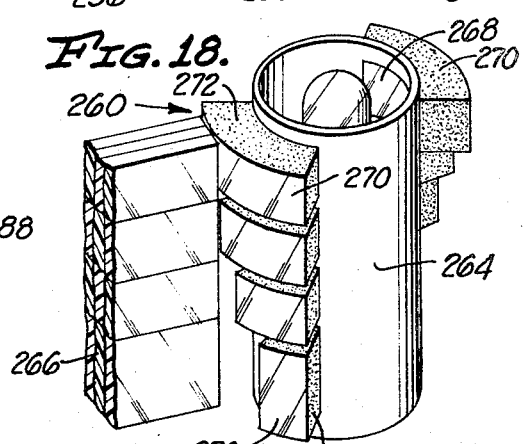
FIG. 18 is a modified form of shutter mechanism useful in the preferred embodiment of this invention.

Referring now to FIG. 18, a further shutter mechanism is indicated generally at 260. Shutter mechanism 260 comprises lamp 262 mounted within rotatable shutter tube 264 which is related to sign panel 266. It can be seen that sign 266 is made up of a plurality of thicknesses and a plurality of rows as sign elements, similar to the structure of FIGS. 5, 6 and 17. The distinguishing feature in the shutter mechanism 260 is the shutter tube 264 which has openings 268 therein and light transmitting members 270 associated therewith. Each of the light transmitting members 270 is of the same functional nature as the sign elements 266 so that each serves to direct and pipe light. Members 270 extend from the openings 268 in the otherwise opaque shutter tube 264 to a position closely adjacent the ends of the elements in sign panel 266. Furthermore, the inside and outside faces of members 270 are transparent while the edges 272 are rendered opaque by a suitable light reflecting coating thereon. Thus, members 270 serve to accurately transmit light from the openings 268 to the elements in the sign panel. The closeness of the outer faces of the light transfer members 270 to the edge of the sign panel not only causes efficient light transmission to thereby cause greater illumination of the sign panel, but also provides a sharper light turn on and cut off as the shutter tube 264 rotates with respect to sign panel 266.

A slightly modified embodiment of FIG. 18 would include the use of a shutter tube which is made entirely of the transparent material and is rotated with respect to the associated sign panel. Shuttering would be accomplished in this embodiment by causing the areas in which light transmission is not desired to be opaque, but leaving the desired light transmission areas transparent. This could be readily accomplished by the application of a reflective, opaque paint.

Referring now to FIG. 19, a further embodiment of the animated sign of this invention is generally indicated at 274. Sign 274 has base 276, lamp post 278 and sign panel 280. Both the base 276 and the lamp post 278 are identical to the structure shown in FIG. 2. However, sign 274 includes a further lamp post 282 arranged at the opposite edge of sign panel 280. Sign panel elements 284, 286 and 288 are illuminated from lamp 290 in the animated manner described with respect to FIG. 2. Lamp 292 is positioned in lamp post 282 and is arranged to illuminate sign element 294. However, rather than being arranged with a movable shutter, lamp 292 corresponds to the lamp 58 in the structure of FIG. 2 and is arranged to blink on and off by means of a thermal blinking structure alternately with other sign elements 284, 286 and 288 or by a switch actuated by motor 296. Sign element 294 is illuminated by lamp 292 and thus blinks on and off while the sign elements 284, 286 and 288 provide an animated information display.

Referring now to FIG. 20, a further and similar embodiment of the animated sign is generally indicated at 298. Sign 298 has a base 300, lamp posts 302 and 304 and sign panel 306. Lamp post 302 contains lamp 308 and a shutter rotated around lamp 308 by motor 310, identically to the structure of FIG. 2. Lamp post 304 contains lamp 312 which is also surrounded by rotatable shutter such as shutter 66. The shutter is rotated by means of belt 314 which is driven by motor 310. By this construction additional effects can be derived.

One of the desirable effects is illustrated in FIG. 21 wherein a detail of the sign panel 306 is shown. Sign panel 306 has three sign elements 316, 318 and 320 which are illuminated by lamp 312 and three sign elements 322, 324 and 326 which are illuminated by lamp 318. By arranging various animation features on the various sign elements different effects may be obtained. These effects may require synchronous operation of the shutters associated with lamps 308 and 312, and such can be accomplished by using a toothed type belt 314, or other positive drive means.

In the form illustrated, sign elements 322, 324 and 326 are arranged as a top row of four horizontally divided sign element assemblies. Thus, the sign elements 322, 324 and 326 may be illuminated in the manner shown in FIG. 2, and have progressively illuminated indicia thereon. The further effects accomplished by the rear sign elements 316, 318 and 320 can include the visual impression of a running border. In this case the sign elements 316, 318 and 320 are of the full dimension of sign panel 306, and carry appropriate border indicia. As is shown in FIG. 21, sign element 316 carries border indicia 328, sign element 318 has border indicia 330 and sign element 320 has border indicia 332. These are progressively arranged so that upon sequential illumination of sign elements 316, 318 and 320, a row of illuminated spots corresponding to these border indicia appears to move around the periphery of the sign panel 306. Of course, other effects can be managed by this arrangement, including the use of a double face sign where an opaque plate is placed between sign elements 320 and 322. Furthermore, a message of one color or character can be illuminated on the rearmost sign elements while a different kind of message is illuminated on the front. For example, in the rear an animated figure may illustrate the written message indicated upon the front sign element. Thus, the sign 298 provides greater flexibility in display than the preferred embodiment of FIG. 2.

Referring now to FIGS. 22 and 23, an exemplary sign element 334 is shown therein. Sign element 334 is an illustrative embodiment of the preferred nature of the manner in which indicia are engraved in the various sign elements mentioned in this specification. Thus, sign element 334 is illustrative of the various other sign elements referred to herein. The sign element 334 is made of material capable of piping light, of which acrylic polymer composition material is the best known and most suitable as described above. Sign element 34 has a top edge 336 and a bottom edge 338. These edges abut adjacent sign element edges within the sign, or are retained in the frame around the edge thereof. These edges are preferably made opaque and internally reflective by the application of aluminum paint, or other highly reflective surface finishing material so as to prevent escape of light from these edges to maintain the particular sign element 34 at its highest illumination potential, and also to prevent the escape of light into adjacent sign elements to keep them as dark as possible when their illumination is not desired. Reflective treatment is also preferred on the end that is not subject to the illumination. Illumination edge 340 is the edge into which light is selectively directed, such light being controlled by the previously described shutter construction. Illumination edge 340 is preferably polished so as to admit as much light as possible.

Referring now particularly to the indicia 342, it is noted that sign element 334 has a front surface 344 and a rear surface 346. The indicia 342 is engraved into sign element 334 through the rear surface 346 so as to represent a slight depression in the rear surface. The engraved indicia preferably has vertical striations therein, the striations being arranged at right angles to the direction of illumination. It is seen that with the light entering the illumination edge 340 that such striations as are illustrated give increased intensity to the illumination of the indicia 342. While engraving has been described with respect to the indicia 342, it is clear that other means can be used to produce the required shape, depth and character of the impression. Such other means are hot stamping of the indicia therein, or injection molding of the entire sign element 334.

Referring now to FIGS. 25 through 29, a further embodiment of the animated sign of this invention is generally indicated at 348. In this embodiment housing 350 is arranged so as to cover the mechanical portions of the sign 348 and to provide an opening therein for the observation of the sign elements. Housing 350 contains motor 352 which has output sheave 354. Output sheave 354 is engaged by belt 356 which drives rotatable tubular shutter 358. Shutter 358 has openings similar to those described in the earlier rotatable shutter tubes. Lamp 360 is mounted within shutter tube 358, and lamp post 362 is mounted around shutter 358. Lamp post 362 has opening 364 to permit entry of light into the edge of the hereinafter described sign elements. Thus, the lamp and its associated lamp tube and shutter structure is similar to the earlier described structures in which a movable shutter controls the light to sign elements.

Cam 366 is mounted for rotation with the shutter and controls the opening and closing of switch 368. Switch 368 is connected in series with lamp 360 so that it is turned off under the dictates of the shape of cam 366. As is seen in FIG. 28, wherein the switch is arranged so that the low portion of the cam represents the off condition of clamp 360, the lamp is off about one-quarter of the revolution of the shutter.

Also driven by sheave 354 is belt 370 which engages around properly positioned guiding idlers 372 and 374 to engage and drive sheave 376. Sheave 376 is rotatably mounted on frame 378, and sheave 376 acts as a Geneva drive gear. Geneva drive pin 380 is mounted on sheave 376 and is arranged to engage with four cornered Geneva star wheel 382 which is mounted on a shaft 384. Shaft 384 rotates with star wheel 382 and is rotatably mounted in frame 378 and in lamp post 362. Similarly, shaft 386 is rotatably mounted in frame 378 and the lamp post 362. Sheaves 388 and 390 are respectively secured to shafts 384 and 386, and carry belt 392 so that shaft 386 rotates with shaft 384. Also rotatably mounted in frame 378 and lamp tube 362 are shafts 394 and 396. Sheaves 398, 400, 402 and 404 are irrotatably mounted on the several shafts as illustrated, and are inter-connected by means of belts 406 and 408. Thus, it can be seen that when star wheel 382 rotates a quarter of a turn, each of the shafts also rotates a quarter of a turn. It is to be noted that while the flexible connecting elements are generically noted as being belts, a positive drive structure is preferred. Accordingly, toothed belts, chains or bead chains are preferred so that each of the moving members is moved in synchronism with the others. In this respect it should be noted that cam 366 is timed with respect to Geneva drive gear 376 in such a manner that the lamp 360 is not illuminated when the star wheel 382 is in motion.

As is illustrated in FIG. 29, irrotatably secured to each of the shafts is a square sign element support framework. The framework associated with shaft 394 is identified at 410 while the framework associated with the shaft 396 is indicated at 412. Sign elements 414, 416, 418 and 420 are associated with frame 412, while sign elements 422, 424, 426 and 428 are associated with frame 410. Each of the sign elements 414 through 428 has suitable indicia formed thereon so that upon illumination from one end, the indicia are rendered lighted. It is clear that in addition to the single thickness of sign elements disclosed in this embodiment that a plurality of thicknesses in front to back relationship can be employed so as to permit progressive illumination of different layers. Thus, the amount of information displayed by this sign can be enhanced. In view of this particular construction, it is desirable to have the frames 410 and 412 opaque so that the structure behind the rear surface of each sign element is not visible from the front. As is seen in FIG. 27, the front sign element 414 is lined up with opening 364 so that the sign element 414 is illuminated from its left end when the shutter is open thereto and when the lamp 360 is illuminated. As was previously described, the lamp 360 is illuminated when the sign elements are not moving. Similarly to the positioning of sign element 414, the sign element 422 is positioned in line with the opening 364 and its illumination is also controlled by shutter 358.

Thus, when the shafts and their respective sign elements are positioned the shutter 358 selectively illuminates the sign elements then facing the front of the sign and visible through opening 430. Opening 430 is directed toward the viewers so that the sign elements then positioned at the front are visible. Baffles 432 prevent view between the several shafts. It can be seen that by suitable arrangement of the shutter the several sign elements positioned toward the front can be sequentially illuminated. After such sequential illumination, the lamp is turned off, new sign elements are rotated into place, the lamp is again illuminated and these are sequentially illuminated. Thus, the sign of the embodiment shown in FIGS. 25 through 29 has a greater display area, yet maintains the animated features of this invitation.

In some installations it may be desirable to use a single rotating structure which provides three or more successively displayed faces. In view of this opportunity to display successive faces, a plurality of such rotating structures does not need to be employed. However, such structures can be increased in the amount of display information by providing a plurality of thicknesses of sign elements as described with respect to the preferred embodiment.

Referring now to the embodiment of the animated sign shown in FIGS. 30 through 33, the animated sign therein is generally indicated at 434. Sign 434 is housed in housing 436 and is similar in a number of respects to the animated sign 348. Drive motor 436 is identical to motor 352, and the structure in lamp post 438 is identical to the structure in lamp post 362. Furthermore, cam 440 operates switch 442 to selectively illuminate the lamp in lamp post 438, in the manner described with respect to lamp 360.

In sign 434, drive belt 444 passes around idlers 446 and 448 to drive sheave 450. Sheave 450 is suitably fixed to a rotatable shaft mounted in suitable bearings, and the shaft carries cam 452. Cam 452 vertically drives pawl 454 against the urging of spring 456.

Ratchet wheel 458 carries three ratchets thereon, but as is apparent from the drawings, pawl 454 does not have sufficient stroke to rotate shaft 460, upon which ratchet wheel 458 is fixed, a full 120 degrees, for it cannot reach sufficiently far around ratchet wheel 458 to engage the next ratchet. However, ratchet wheel 458 has spring urge ball 462 positioned in the cavity therein. Spring 464 engages under ball 462 to urge it out of the cavity.

Cam 466 is fixed with respect to frame 468 and acts as a face cam in cooperation with ball 462. Cam 466 has its face duplicated at 120 degree increments and each 120 degrees comprises a relatively long slope through which the ball 462 extends from its cavity and a relatively short slope wherein the ball 462 is urged back into its cavity. Thus, upon a downward stroke of pawl 454, the ratchet wheel 458 is moved a relatively short distance in the counter-clockwise direction, as is seen in FIG. 31. This relatively small rotation causes the ball 462 to be thrust back into its cavity by reason of the rising cam face, and pawl 454 carries ratchet wheel 458 a sufficient distance so that the ball 462 is again positioned on this longer slope where outward motion of ball from its cavity under the urging of spring 464 causes rotation of ratchet wheel 458 and its shaft 460 in the forward ratchet direction, counter-clockwise as is seen in FIG. 31. Thus, by this simple structure one-third revolution advance of shaft 460 is accomplished. This structure is resorted to, for Geneva mechanisms are not able to cause 120 degree advance.

Shafts 470, 472 and 474 are driven from shaft 460 by means of suitable sprockets and bead chain 476. Thus, each of these shafts rotates one-third revolution at the same time under the agency of the drive mechanism shown in FIGS. 31 and 32. Each of the four shafts carries three sign elements. As is shown in FIG. 33, sign elements 478, 480 and 482 are secured to shaft 474 to be rotated therewith. As is apparent from FIG. 33, these sign elements on adjacent shafts can be arranged so that they are in edge to edge relationship. Thus, sign element 478 is in edge to edge relationship with sign element 484 which is mounted on shaft 472. Thus, when they are positioned in the proper sign viewing position, each of the front sign elements lying in a single plane, the ends of these sign elements 478 and 484, and the remaining sign elements positioned on the front, are in line with the opening in lamp tube 438 so that the lamp and shutter therein can selectively illuminate the different elements in sequence.

After the message on the sign elements is fully shown, the drive mechanism is operated so that all four of the shafts rotate to present four new sign elements. As has been previously indicated, these are sign elements which are adapted to be edge lighted and upon such edge lighting the indicia in the sign elements positioned in the front are selectively illuminated in accordance with the shutter pattern. It is apparent that the sign 434 has the advantage over the sign 348 in presenting a planar front face for selective animated illumination. However, the sign 348 has the additional benefit of being able to present four or more different sign elements to the front in each level, while the sign 434 is limited to three.

This invention having been described in its preferred embodiment, and a plurality of alternative embodiments illustrating the manner in which the preferred embodiment is related to other structures have been disclosed, it is clear that the invention is susceptible to numerous modifications and changes without the exercise of the inventive faculty. Accordingly, the scope of this invention is defined by the scope of the following claims.

I claim:
1. An animated sign which comprises:
   a lamp;
   a lamp post means surrounding said lamp;
   said lamp post means having an opening located in the wall thereof;
   a sign panel extending along said opening in said lamp post generally away from said lamp post;
   said sign panel comprising a plurality of rows of sign elements;
   each of said sign elements having a front, a back and ends;
   each of said sign elements being made of a material which transmits light;
   each of said sign elements having an indicia formed thereon which is illuminated by the transmission of light when light is supplied to an end of said sign panel;
   each of said sign elements having an edge located adjacent to said opening in said post;
   said sign elements in said rows being located in front to back relationship so that the indicia in an illuminated sign element in back of another sign element is visible through the other sign element;
   shutter means movably mounted in said lamp post so as to be capable of being moved with respect to said opening in said lamp post;
   means for moving said shutter means connected to said shutter means;
   said shutter means having opening means for allowing light to be transmitted from said lamp to edges of said sign elements located therein in a position to be opposite each of said rows during movement of said shutter means;
   said opening means in said shutter means being offset with respect to said opening in said post means so as to provide progressive leading edges so that during movement of said shutter means said sign elements are sequentially illuminated through said opening in said lamp post.

2. An animated sign as claimed in claim 1 wherein said shutter means is a tubular member and said means for moving rotates said shutter means.

3. An animated sign as in claim 1 wherein said opening means are constructed so that as said shutter means is moved and said sign elements have been sequentially illuminated all of said sign elements are illuminated.

4. An animated sign as claimed in claim 1 wherein said opening means are constructed so that as said shutter means is moved only one of said sign elements is illuminated at one time.

References Cited

UNITED STATES PATENTS

| | | | |
|---|---|---|---|
| 2,524,657 | 10/1950 | Ford | 40—130 |
| 2,639,528 | 5/1953 | Ochsner | 40—130 |
| 2,722,762 | 11/1955 | Krajian | 40—130 |
| 3,076,278 | 2/1963 | Zack | 40—130 |
| 3,208,174 | 9/1965 | Wrenshal | 40—130 |
| 3,273,274 | 9/1966 | Pearce | 40—130 |

FOREIGN PATENTS

| | | |
|---|---|---|
| 642,844 | 3/1937 | Germany. |
| 291,067 | 5/1953 | Switzerland. |

LAWRENCE CHARLES, *Primary Examiner.*